Sept. 10, 1940.   G. SIFKOVITZ   2,214,000
VALVE OPERATING MECHANISM
Original Filed Sept. 12, 1936
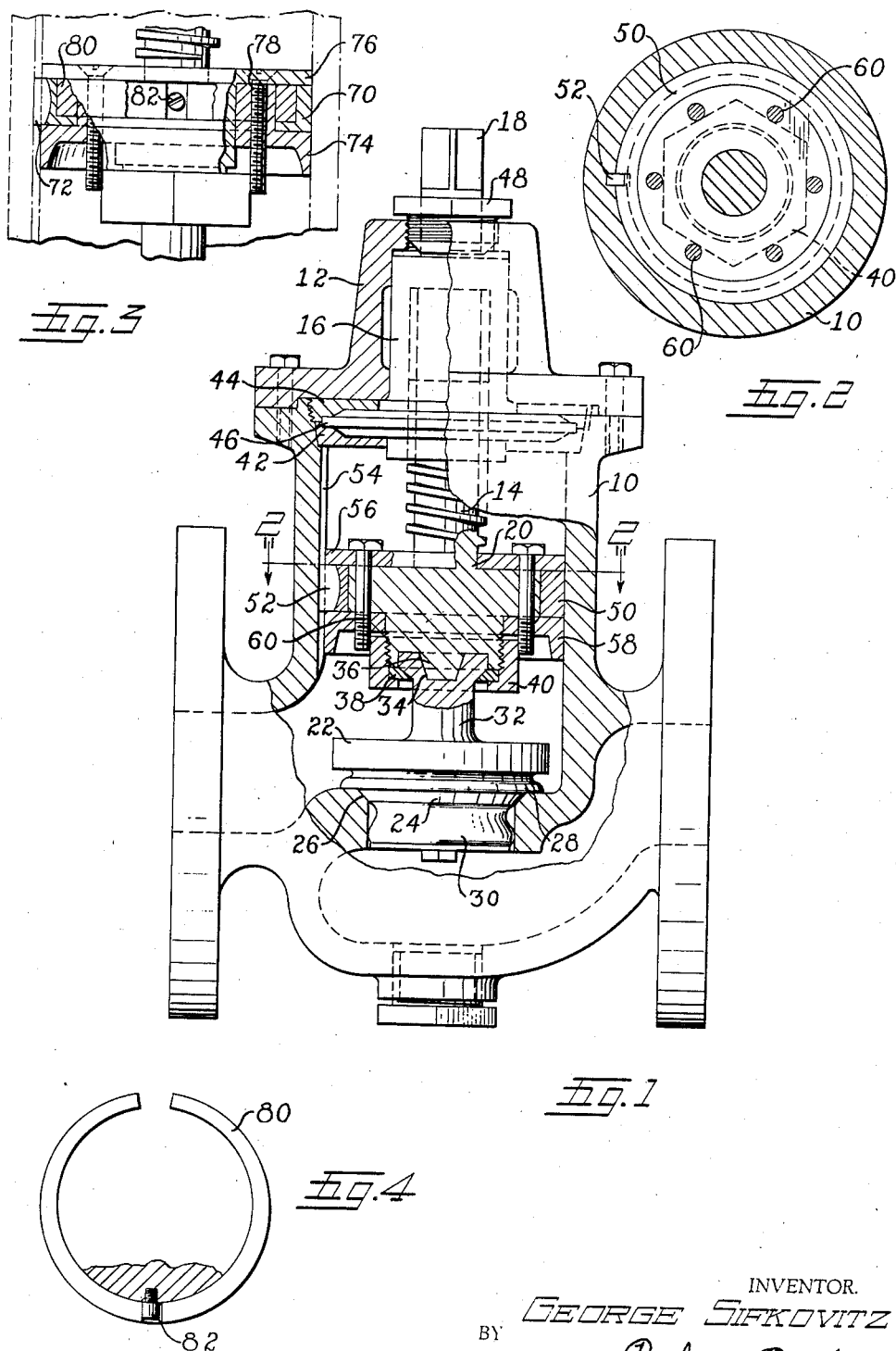
INVENTOR.
GEORGE SIFKOVITZ
BY Parker & Burton
ATTORNEYS.

Patented Sept. 10, 1940

2,214,000

UNITED STATES PATENT OFFICE 2,214,000

VALVE OPERATING MECHANISM

George Sifkovitz, Saegertown, Pa., assignor to The George Valve Company, Saegertown, Pa., a corporation of Delaware Original application September 12, 1936, Serial No. 100,487. Divided and this application June 3, 1938, Serial No. 211,508

9 Claims. (Cl. 137—139)

This invention relates to valves and more particularly to an improved operating mechanism for opening and closing valves. This application forms divisional subject matter of my copending application, Serial No. 100,487, filed September 12, 1936.

An important object of this invention is to provide a novel operating mechanism for valves. This invention constitutes an improvement of the valve operating mechanism described and claimed in my copending application, Serial No. 40,377, filed September 13, 1935, and now Patent No. 2,179,165, granted November 7, 1939. It provides an improved way of releasing the valve closing member or valve head from further advance upon the valve seat after proper seating has taken place.

As described and claimed in my aforesaid application, Serial No. 40,377, and Patent No. 2,179,165, a spiral or threaded drive is established between rotatable and certain bodily movable parts and one improvement described herein relates specifically to a frictional releasing device which frees the valve head from further advance upon the valve seat and yet permits the valve operating parts to respond to the actuating force. The provision of a frictional release of this character allows the operating mechanism to function at any time but acts automatically to prevent further advance of the valve head beyond its fully opened or closed position so that no damage is done to the parts. This provision is particularly desirable for valves subjected to large operating forces, such as power operated valves, which are difficult to stop precisely when the valve head is in fully closed or opened position.

A modification of this invention employs a novel auxiliary or emergency frictional release mechanism which positively insures joint rotation of parts when the valve head reaches the extreme positions of its movement.

An important novel feature of this invention is the provision of an improved swivel joint connecting the valve head to one of the rotatable members of the valve operating mechanism. This improved swivel joint cooperates with the operating mechanism by allowing the valve head to immovably seat on the valve seat while the member to which it is attached rotates in response to operating forces. More particularly, the swivel joint comprises parts which are adjustable and which may be adjusted so that the valve head may have a slight angular play. This will allow the head to adjust itself to the valve seat and insures perfect seating irrespective of any irregularities in the functioning of the parts.

Various objects, advantages and meritorious features will become more fully apparent from the following specification, appended claims and accompanying drawing, wherein:

Figure 1 is a vertical section through a valve structure illustrating one embodiment of the invention, Fig. 2 is a cross-sectional view along line 2—2 of Fig. 1, Fig. 3 is a detail view of a modification of the operating mechanism illustrated in Fig. 1, and Fig. 4 is a detail view showing the manner of associating the split halves of the auxiliary or emergency ring structure.

Referring to Fig. 1, the operating mechanism illustrated therein is shown associated with a globe type of valve but it is understood that the invention is readily adaptable to other types of valves. In Fig. 1 the body of the globe valve is indicated at 10 and a cap or bonnet 12 is removably secured thereto. Extending longitudinally through this valve body is a valve stem member 14 having external threads engaging with internal threads in the interior of a rotatable cup-shaped member 16. This last member has a part 18 extending through the cap 12 and is shaped to receive any suitable valve operating appliance. The threaded relation of member 16 to 14 is such that rotation of the former relative to the latter will impart a longitudinal movement to the latter.

The lower end of the valve stem member 14 is enlarged as at 20 for a purpose to be described hereinafter. Secured to the enlarged end of the valve stem member is a valve head 22 carrying a circular valve seat engaging part 24 adapted in its lowermost position to engage the valve seat 26 and close the valve. Circular valve seat wipers and protectors 28 and 30 similar in construction and operation to those described and claimed in my co-pending application, Serial No. 100,487, are carried by the valve head 22. These elements are flexible and will spread apart and expose the valve seating parts as the valve head approaches the valve seat.

The valve head is rotatably and floatably coupled to the valve stem through a swivel joint assembly. The valve head is provided with a shank 32 widened at its upper end. A conical recess 34 is formed in the end of the shank. The base end of the valve stem section 20 is provided with a conical protuberance or nub 36 which fits therein as shown. The nub is tapered similarly to the inclined walls of the recess 34. The outside of the widened end of the shank 32 is upwardly inclined. A split washer 38 is provided with an inner inclined face corresponding to the exterior inclined face of the shank. A nut 40 is threaded to the enlarged end 20 of the valve stem and is shouldered to form a seat for the split washer. The hole in the base of the nut is wide enough to admit passage of the widened end of the shank 32 therethrough. The split washer 38, however, projects radially inwardly beyond the edge of the hole in the nut and when the parts of the swivel joint are properly assembled functions as a seat for supporting the shank in place against the bottom of the valve stem. The split character of the washer enables the washer to be slipped into assembled position when the nut 40 is first threaded on the valve stem. The shank can be brought into close contact with the conical nub or slightly spaced therefrom by adjusting the threaded engagement of the nut. By adjusting nut 40 so that the valve head has a slight angular play, the valve head will adjust itself to the seat as the valve is closed.

To seal the valve structure against leakage, a novel packless valve assembly is provided in the upper section of the valve body. This feature is described and claimed in my copending application Serial No. 211,507 filed June 3, 1938. In general, the parts of this assembly comprises a radial flange or rim 46 formed on the cup-shaped member 16. This flange is provided with circular inclined machine finished faces on opposite sides thereof. Fluid tight sealing means engaging these finished faces comprise a pair of ring-shaped members 42 and 44 removably secured in the wall of the valve body. The inner faces of these members are machine finished for close fit with the finished faces on the radial flange and when bearing thereon form a pair of ground joints sealing the rotating member 16.

A compensating nut or gland 48 threaded to cap 12 bears upon the upper end of the operating member 16 and functions as an auxiliary leak-proof structure. Threaded adjustment of this nut will also vary the resistance of the operating member 16 to turning forces. In addition, this nut acts to hold the operating member against longitudinal movement as it acts upon the valve stem member 14.

The valve operating mechanism which forms the feature claimed herein provides an automatic unloading action which frees the valve head from further longitudinal movement although the operating parts continue to function in response to an operating force. This mechanism is assembled on the enlarged end of the valve stem member and comprises an annular member or ring 50 keyed by means of a key 52 in a guideway 54 formed in the wall of the valve body. This prevents the ring from rotating but allows it to move lengthwise through the valve body. The ring is carried between parts of the valve stem assembly. These parts comprise top and bottom plates 56 and 58 which frictionally contact the top and bottom surfaces of the ring. Bolts 60 extending through aligned holes in these plates and in the enlarged section 20 of the valve stem secure these parts together in assembled condition as shown. The compression with which these plates engage the ring can be varied by threaded adjustment of the bolts 60. The frictional engagement between the surfaces of the plates and the ring acts to retard rotation of the valve stem 14 and thereby cause relative rotation between the spirally threaded members of the valve. Since member 16 is held from longitudinal movement in the valve body, rotation of this member relative to the valve stem will cause the latter to move either toward or away from the valve seat depending upon which direction the operating member 16 is turned.

When the valve head reaches the extreme position of its movement, such as when it engages the valve seat, and the resistance to further advancement is greater than the frictional resistance of the ring 50, the latter will yield permitting rotation of the valve stem. This prevents further advancement of the valve stem. It is apparent, therefore, that the operating parts are responsive to operating forces irrespective of whether or not the valve head has reached the extreme positions of its movement. The greater resistance to turning movement encountered when the valve stem rotates relative to the ring will indicate to the operator that the valve head cannot be moved any farther in the direction it has advanced.

As shown in Fig. 2, the nut 40 is provided with flat side faces. The bolts 60 are arranged to pass closely adjacent these faces. In this way they act to hold the nut against turning once it has been adjusted to the valve stem.

In Figs. 3 and 4, there is shown a modification of the frictional release mechanism previously described. A ring 70 similar in function to ring 50 is grooved to receive a key 72. The enlarged end 74 of the valve stem is stepped to form a circular shoulder upon which the ring 70 is supported. A plate 76 similar to plate 56 is secured to the enlarged end of the valve stem by bolts 78. This plate extends laterally to the inner wall of the valve body and overlaps upon the top surface of the ring 70.

As shown, ring 70 is interiorly grooved to receive a split ring 80. This split ring constitutes an auxiliary or emergency ring. The outside ring 70 constitutes the main unloader ring. The enlarged end of the valve stem is provided with a protruding pin 82 which extends between the spread ends of the split ring. This pin will engage either one or the other of the adjacent ends of the split ring when the valve head commences to rotate and expand the split ring against the inner wall of the main ring 70. One end section of each half of the split ring is tapered on its outside circumference as shown in Fig. 4. The split ring should be assembled in the valve with the pin 82 extending between the thicker ends of the ring sections. The taper on the sections of the split ring causes the expansion of the halves of the split ring, irrespective of the direction of rotation, into engagement with the main ring by wedging them thereagainst. Positive frictional engagement is assured at all times by this construction. Any wear is automatically compensated for by further expansion of the split ring 82. Thus the split ring serves as additional frictional contacting means between the valve stem and ring 70, and its automatically expandible character insures increasing frictional retardation if the frictional retardation imposed by the ring 70 on the plate 76 and on the shoulder of the valve stem is insufficient.

The operating parts of the valve structures described herein are preferably lubricated by oil or grease. This may be done after the valves are assembled by pouring oil or grease through the hole in the top of the bonnet 12 before the gland 48 is threaded thereto. When the valve is intended to be used in connection with hot fluids, such as steam, the lubricating medium may be a mixture of oil and graphite.

What I claim is:

1. A valve comprising, in combination, a casing, a valve seat in said casing, a rotatable valve member in said casing having a valve head retractibly engageable with said valve seat, a second rotatable member in said casing, a spiral drive coupling said rotatable members together and operable upon relative rotation of said members to cause the member carrying the valve head to move longitudinally in the casing and seat the valve head upon said valve seat, means for rotating one of said members, and means yieldingly restraining rotation of the other member comprising a ring-shaped element surrounding said last member and frictionally engageable therewith, and means permitting longitudinal movement of said element in said casing to accompany said longitudinally movable member but preventing rotation thereof.

2. Valve operating mechanism comprising, in combination, a pair of members, spiral means threadedly coupling said members together and adapted to impart longitudinal movement to one of said members when relative rotation takes place between said members, means for rotating one of said members, means for yieldingly restraining rotation of the other member so as to cause relative rotation therebetween, said last means comprising an element fixed against rotation but slidable longitudinally with said last mentioned member and frictionally engaging said last member to yieldingly prevent rotation thereof.

3. Valve operating mechanism comprising, in combination, a pair of rotatable members, spiral means coupling said members together and adapted to impart longitudinal movement to one of said members when relative rotation takes place between said members, means for yieldingly restraining rotation of the longitudinally movable member, said means comprising a ring-shaped element fixed against rotation but movable longitudinally to accompany said longitudinally movable member, a split ring carried by said last member and expandible into engagement with said element, and means carried by said last member operable to engage an end of said split ring and expand the same into engagement with said element upon rotation of the member.

4. A valve comprising, in combination, a hollow valve body, a cap removably secured to said body, a bodily movable valve closure member retractibly engageable with a valve seat to close the valve, a rotatable operating member spirally threaded to said valve closure member and adapted upon relative rotation of said members to impart bodily movement to the valve closure member, a ring-shaped member in the valve body encircling said closure member and frictionally bearing thereagainst, means holding said ring-shaped member against rotation but allowing the same to travel with the valve closure member as the latter moves toward or away the valve seat, means extending through the cap for rotating said operating member, and means adjustably secured to said cap and bearing upon said operating member, said last means adapted upon adjustment to vary the resistance of the operating member to turning forces applied thereto.

5. In a valve, a pair of rotatable members, means coupling said members together and adapted upon relative rotation to cause one of the members to move axially toward or away from a valve seat, an element frictionally contacting said axially movable member, a key-way in said valve, and a key interlocking with said element and slidable in said key-way thereby preventing rotation of the element in the valve but allowing the same to travel with the axially movable member as the latter advances toward or away from the valve seat, said element frictionally retarding rotation of said axially movable member to thereby cause relative rotation between said members when the other member is rotated.

6. In a valve, a pair of rotatable members, means coupling said members together and adapted upon relative rotation to cause one of the members to move axially toward or away from a valve seat, an element frictionally contacting said axially movable member, a key-way in said valve, a key interlocking with said element and slidable in said key-way thereby preventing rotation of the element in the valve but allowing the same to travel with the axially movable member as the latter advances toward or away from the valve seat, said element frictionally retarding rotation of said axially movable member to thereby cause relative rotation between said members when the other member is rotated, and auxiliary friction means carried by said axially movable member and expandible into frictional engagement with said element when rotation of the axially movable member occurs.

7. In a valve, a rotatable and axially movable member, a ring encircling said member, means holding said ring against rotation but allowing it to move in a path parallel to said member, means on said member contactually overlapping upon the opposite ends of the ring and forcing the ring to travel with the member in its axial movement, said ring acting as a result of its being held against rotation to frictionally retard rotation of said member but being free to travel axially therewith.

8. In a valve, a rotatable member, a split ring assembly encircling said member and expandible into frictional engagement with the inner circular wall of a surrounding element, and means carried by said member extending between the parts of said split ring assembly and adapted upon rotation of the member to spread the parts into frictional engagement with the inner circular wall of said element and thus act to retard rotation of said member.

9. In a valve, a pair of rotatable members, an assembly on one of said members acting to retard rotation of one of the members including an element engaging a fixed part in the interior of the valve, a valve head, a swivel joint assembly coupling said valve head to one of said members including a flat sided nut enclosing the swivel joint and holding the parts together, and a bolt in the first mentioned assembly projecting past said nut in close proximity to one of the flat sides thereof forming a stop against which the adjacent corners formed by said flat sides strike when the nut is turned.

GEORGE SIFKOVITZ.